US011043128B1

(12) United States Patent
Kurosawa et al.

(10) Patent No.: US 11,043,128 B1
(45) Date of Patent: Jun. 22, 2021

(54) MERGING SUPPORT INFORMATION DISTRIBUTION APPARATUS, MERGING SUPPORT SYSTEM, MERGING SUPPORT INFORMATION DISTRIBUTION METHOD, AND COMPUTER PROGRAM

(71) Applicant: Toyota Jidosha Kabushiki Kaisha, Toyota (JP)

(72) Inventors: Kengo Kurosawa, Fujimino (JP); Takeshi Kitahara, Fujimino (JP); Koutarou Ichikawa, Fujimino (JP); Satoshi Komorita, Fujimino (JP); Masayuki Itoh, Nagoya (JP); Daisaku Honda, Nagoya (JP); Yusuke Nakano, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/120,664

(22) Filed: Dec. 14, 2020

(30) Foreign Application Priority Data

Dec. 18, 2019 (JP) .............................. JP2019-228223

(51) Int. Cl.
*G08G 1/00* (2006.01)
*G08G 1/16* (2006.01)
(Continued)

(52) U.S. Cl.
CPC ......... *G08G 1/167* (2013.01); *G06K 9/00785* (2013.01); *G08G 1/04* (2013.01);
(Continued)

(58) Field of Classification Search
CPC ........ G08G 1/167; G08G 1/164; G08G 1/166; G08G 1/04; G06K 9/00785
See application file for complete search history.

(56) References Cited

U.S. PATENT DOCUMENTS

2007/0067100 A1   3/2007  Matsumoto
2010/0094537 A1*  4/2010  Goto .................. G01C 21/3415
                                                    701/533

(Continued)

FOREIGN PATENT DOCUMENTS

JP        2007-200274 A    8/2007
JP        2012-083995 A    4/2012

*Primary Examiner* — Ojiako K Nwugo
(74) *Attorney, Agent, or Firm* — Dinsmore & Shohl LLP

(57) ABSTRACT

A merging support information (MSI) distribution apparatus includes a MSI reception unit configured to receive MSI including a speed recommended for a vehicle traveling on a branch line to merge with a main line from a merging prediction apparatus, a distribution destination information reception unit configured to receive distribution destination registration information including terminal movement information indicating a movement state of a mobile terminal mounted on the vehicle traveling on the branch line and terminal identification information identifying the mobile terminal from the mobile terminal via a mobile communication network, and an information distribution unit configured to specify the mobile terminal to be a distribution destination to which the MSI is distributed based on the branch line traveling information and the terminal movement information, and distribute the MSI to the specified mobile terminal via the mobile communication network based on the terminal identification information of the specified mobile terminal.

4 Claims, 4 Drawing Sheets

(51) Int. Cl.
*G08G 1/04* (2006.01)
*G08G 1/052* (2006.01)
*G06K 9/00* (2006.01)

(52) U.S. Cl.
CPC ............. *G08G 1/052* (2013.01); *G08G 1/164* (2013.01); *G08G 1/166* (2013.01)

(56) References Cited

U.S. PATENT DOCUMENTS

| | | | |
|---|---|---|---|
| 2011/0106341 A1* | 5/2011 | Kinoshita | G07C 5/008 |
| | | | 701/2 |
| 2011/0130964 A1* | 6/2011 | Kitagawa | G08G 1/096775 |
| | | | 701/301 |
| 2015/0057907 A1* | 2/2015 | Rebhan | B60W 50/0097 |
| | | | 701/93 |
| 2015/0142207 A1* | 5/2015 | Flehmig | G01C 21/3492 |
| | | | 701/1 |
| 2015/0166062 A1* | 6/2015 | Johnson | B60W 10/20 |
| | | | 701/41 |
| 2017/0369059 A1* | 12/2017 | Schuberth | B60W 30/143 |
| 2018/0126989 A1* | 5/2018 | Krabot | B60W 30/18163 |
| 2018/0162396 A1* | 6/2018 | Ibuka | B60W 60/0053 |
| 2019/0061780 A1* | 2/2019 | Han | G05D 1/0061 |
| 2019/0143972 A1* | 5/2019 | Ishioka | B60W 30/162 |
| | | | 701/70 |
| 2019/0367034 A1* | 12/2019 | Okajima | B60W 10/18 |
| 2020/160076 A1* | 5/2020 | Suzuki | G06K 9/00832 |
| 2020/0207355 A1* | 7/2020 | Ishioka | B60W 30/181 |
| 2020/0302793 A1* | 9/2020 | Oyama | G08G 1/167 |
| 2021/0016778 A1* | 1/2021 | Yashiro | B60W 60/001 |

\* cited by examiner

MERGING SUPPORT INFORMATION DISTRIBUTION APPARATUS, MERGING SUPPORT SYSTEM, MERGING SUPPORT INFORMATION DISTRIBUTION METHOD, AND COMPUTER PROGRAM

CROSS REFERENCE TO RELATED APPLICATIONS

This application is based upon and claims the benefit of priority from Japanese patent application No. 2019-228223, filed on Dec. 18, 2019, the disclosure of which is incorporated herein in its entirety by reference.

BACKGROUND

The present disclosure relates to a merging support information distribution apparatus, a merging support system, a merging support information distribution method, and a computer program.

A merging support system according to related art is disclosed in, for example, Japanese Unexamined Patent Application Publication No. 2007-200274. In the merging support technique according to the related art disclosed in Japanese Unexamined Patent Application Publication No. 2007-200274, a navigation apparatus mounted on a vehicle traveling on a branch line calculates a recommended merging speed for the vehicle based on estimated information about a traveling speed and a position of the vehicle traveling on a main line that is based on a photographed image of the main line acquired from a roadside system, and based on measurement information of a traveling speed and a position of the vehicle, and then informs a driver of the calculated recommended merging speed of the vehicle.

SUMMARY

However, in the merging support technique according to the related art disclosed in Japanese Unexamined Patent Application Publication No. 2007-200274, it is necessary to mount a dedicated navigation apparatus having a merging support function on the vehicle, and the roadside system and the navigation apparatus need to include a dedicated communication unit that can directly communicate with each other. For this reason, the cost for the roadside system and the navigation apparatus is large, and it is difficult to widely spread them.

The present disclosure has been made in consideration of such circumstances. An object of the present disclosure is to contribute to an easy implementation of a merging support system.

An example aspect of the present disclosure is a merging support information distribution apparatus including: a merging support information reception unit configured to receive merging support information from a merging prediction apparatus, the merging support information being based on main line traveling information indicating a traveling state of a vehicle traveling on a main line and branch line traveling information indicating a traveling state of a vehicle traveling on a branch line and merging with the main line, and the merging support information including a speed recommended for the vehicle traveling on the branch line to merge with the main line; a distribution destination information reception unit configured to receive distribution destination registration information including terminal movement information and terminal identification information from a mobile terminal via a mobile communication network, the terminal movement information indicating a movement state of the mobile terminal mounted on the vehicle traveling on the branch line, and the terminal identification information identifying the mobile terminal; and an information distribution unit configured to specify the mobile terminal to be a distribution destination to which the merging support information is distributed based on the branch line traveling information and the terminal movement information, and distribute the merging support information to the specified mobile terminal via the mobile communication network based on the terminal identification information of the specified mobile terminal.

Another example aspect of the present disclosure is a merging support system including: the above merging support information distribution apparatus; a main line image pickup apparatus configured to photograph a vehicle on a main line; a branch line image pickup apparatus configured to photograph a vehicle on a branch line merging with the main line; an image recognition apparatus configured to acquire main line traveling information based on a main line image picked up by the main line image pickup apparatus, and acquire branch line traveling information based on a branch line image picked up by the branch line image pickup apparatus, the main line traveling information indicating a traveling state of the vehicle traveling on the main line, and the branch line traveling information indicating a traveling state of the vehicle traveling on the branch line; and a merging prediction apparatus configured to generate merging support information including a speed recommended for the vehicle traveling on the branch line to merge with the main line based on the main line traveling information and the branch line traveling information.

Another aspect of the present disclosure is a merging support information distribution method including: receiving, by a merging support information distribution apparatus, merging support information from a merging prediction apparatus, the merging support information being based on main line traveling information indicating a traveling state of a vehicle traveling on a main line and branch line traveling information indicating a traveling state of a vehicle traveling on a branch line and merging with the main line, and the merging support information including a speed recommended for the vehicle traveling on the branch line to merge with the main line; receiving, by the merging support information distribution apparatus, distribution destination registration information including terminal movement information and terminal identification information from a mobile terminal via a mobile communication network, the terminal movement information indicating a movement state of the mobile terminal mounted on the vehicle traveling on the branch line, and the terminal identification information identifying the mobile terminal; and specifying, by the merging support information distribution apparatus, the mobile terminal to be a distribution destination to which the merging support information is distributed based on the branch line traveling information and the terminal movement information, and distribute the merging support information to the specified mobile terminal via the mobile communication network based on the terminal identification information of the specified mobile terminal.

Another example aspect of the present disclosure is a computer program for causing a computer to execute: receiving merging support information from a merging prediction apparatus, the merging support information being based on main line traveling information indicating a traveling state of a vehicle traveling on a main line and branch line traveling information indicating a traveling state of a vehicle traveling on a branch line and merging with the main line, and the merging support information including a speed recommended for the vehicle traveling on the branch line to merge with the main line; receiving distribution destination registration information including terminal movement information and terminal identification information from a mobile terminal via a mobile communication network, the terminal movement information indicating a movement state of the mobile terminal mounted on the vehicle traveling on the branch line, and the terminal identification information identifying the mobile terminal; and specifying the mobile terminal to be a distribution destination to which the merging support information is distributed based on the branch line traveling information and the terminal movement information, and distribute the merging support information to the specified mobile terminal via the mobile communication network based on the terminal identification information of the specified mobile terminal.

According to the present disclosure, it is possible to achieve an effect of contributing to an easy implementation of the merging support system.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, an embodiment of the present disclosure will be described with reference to the drawings.

Figure 1:
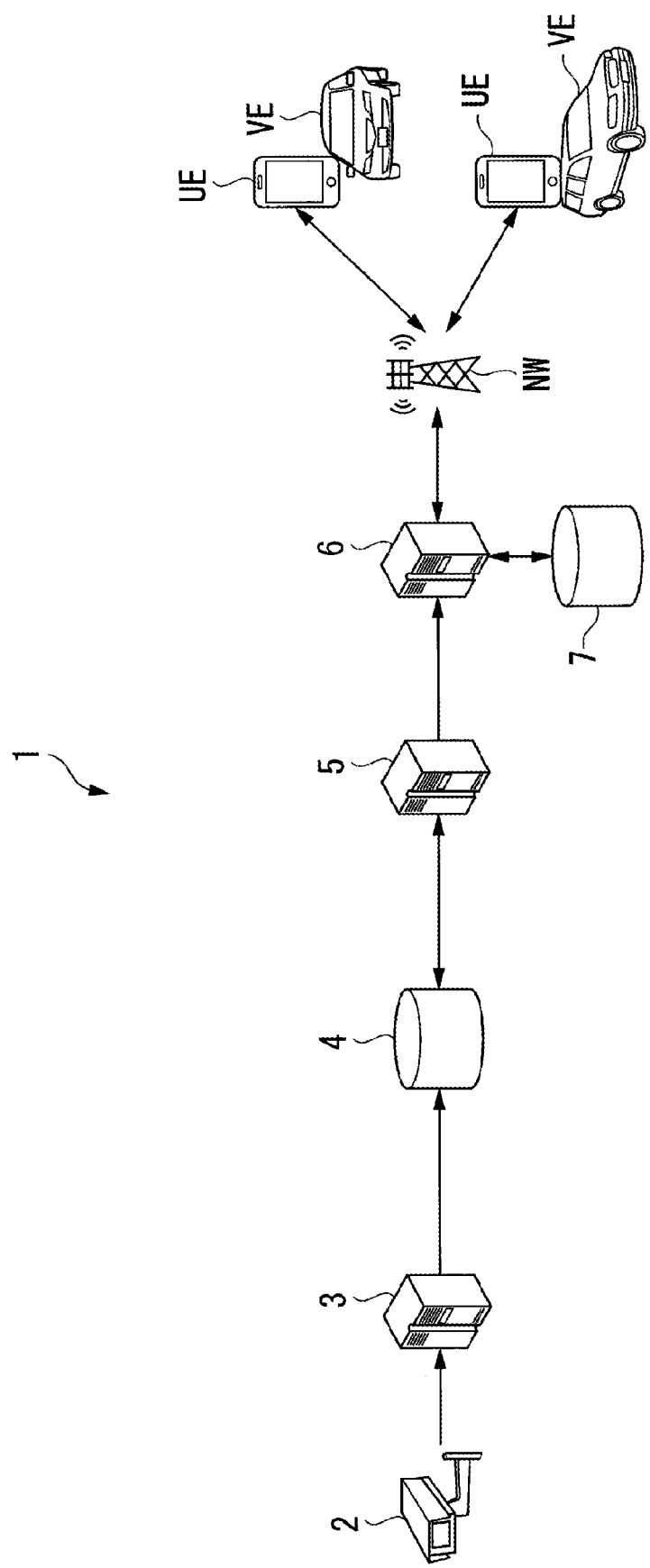
FIG. 1 is a block diagram showing a configuration example of a merging support system according to an embodiment.

FIG. 1 is a block diagram showing a configuration example of a merging support system according to the embodiment. In FIG. 1, a merging support system 1 includes an image pickup apparatus 2, an image recognition apparatus 3, a vehicle traveling information database 4, a merging prediction apparatus 5, a merging support information distribution apparatus 6, and a distribution destination information database 7.

Figure 2:
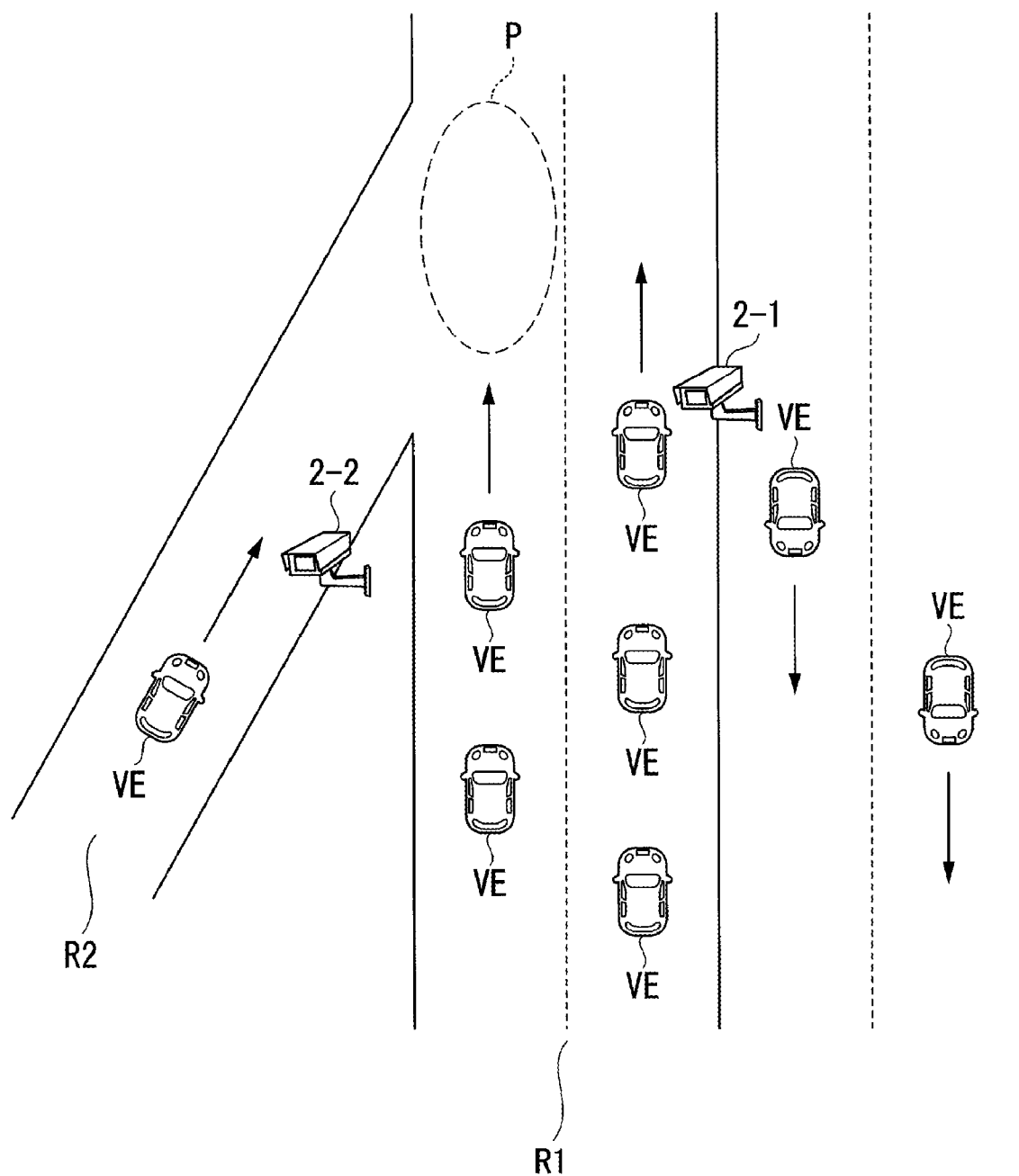
FIG. 2 is an explanatory diagram for describing a merging point according to the embodiment.

As shown in FIG. 2, the image pickup apparatus 2 includes a main line image pickup apparatus 2-1 and a branch line image pickup apparatus 2-2. FIG. 2 is an explanatory diagram for explaining a merging point according to this embodiment. In FIG. 2, a branch line R2 is a road that merges with a main line R1, which is a road on which vehicles VE travel. The main line image pickup apparatus 2-1 is the image pickup apparatus 2 installed to photograph the upstream direction of the main line R1 from a point (hereinafter referred to as a merging point) P where the main line R1 and the branch line R2 merge. The main line image pickup apparatus 2-1 photographs the vehicles VE on the main line R1. The branch line image pickup apparatus 2-2 is the image pickup apparatus 2 installed to photograph the upstream direction of the branch line R2 from the merging point P. The branch line image pickup apparatus 2-2 photographs the vehicles VE on the branch line R2 merging with the main line R1.

Returning to FIG. 1, the description is continued.

The main line image pickup apparatus 2-1 transmits the photographed image (hereinafter referred to as a main line image) to the image recognition apparatus 3. The branch line image pickup apparatus 2-2 transmits the photographed image (hereinafter referred to as a branch line image) to the image recognition apparatus 3. Communication between the main line image pickup apparatus 2-1 and the branch line image pickup apparatus 2-2 and the image recognition apparatus 3 is performed using an existing communication network. The existing communication network includes, for example, wired or wireless LANs (Local Area Network), mobile phone networks such as LTE (Long Term Evolution), and the Internet.

The image recognition apparatus 3 acquires traveling information (hereinafter referred to as main line traveling information) indicating a traveling state of the vehicle VE traveling on the main line R1 based on the main line image picked up by the main line image pickup apparatus 2-1. The image recognition apparatus 3 acquires the main line traveling information by executing image recognition processing for recognizing a vehicle on the main line image. The image recognition apparatus 3 acquires traveling information (hereinafter referred to as branch line traveling information) indicating a traveling state of the vehicle VE traveling on the branch line R2 based on the branch line image picked up by the branch line image pickup apparatus 2-2. The image recognition apparatus 3 acquires the branch line traveling information by executing image recognition processing for recognizing a vehicle on the branch line image.

The traveling information of the vehicle VE includes a vehicle identifier (vehicle ID) of the vehicle VE, an estimated value (latitude and longitude) of the position of the vehicle VE, a traveling time of the vehicle VE (a time at which the vehicle VE has traveled the estimated position (latitude and longitude) of the vehicle VE), and vehicle determination information for determining the vehicle VE. The vehicle determination information includes information about a vehicle type, an exterior color, and a license plate. The image recognition apparatus 3 gives the same vehicle ID as that of the vehicle determination information to the vehicle VE identified based on the vehicle determination information.

The image recognition apparatus 3 transmits the main line traveling information and the branch line traveling information to the vehicle traveling information database 4. The communication between the image recognition apparatus 3 and the vehicle traveling information database 4 is performed using the existing communication network. The vehicle traveling information database 4 stores the main line traveling information and the branch line traveling information received from the image recognition apparatus 3.

The merging prediction apparatus 5 acquires the main line traveling information and the branch line traveling information from the vehicle traveling information database 4. The communication between the merging prediction apparatus 5 and the vehicle traveling information database 4 is performed using the existing communication network. The merging prediction apparatus 5 generates merging support information including a speed (hereinafter referred to as a recommended merging speed) recommended for the vehicle VE traveling on the branch line R2 in order to merge with the main line R1, based on the main line traveling information and the branch line traveling information acquired from the vehicle traveling information database 4.

The merging prediction apparatus 5 calculates a traveling speed and a traveling azimuth angle indicating a traveling direction of the vehicle VE based on a plurality of the estimated values of positions of the traveling information at different traveling times for each vehicle VE (vehicle ID). The merging prediction apparatus 5 determines a lane on which the vehicle VE is to travel on the main line R1 (a lane of the main line R1 on the side of the branch line R2, i.e., a lane of the main line R1 directly merged with the branch line R2) based on the calculated traveling azimuth angle of the vehicle VE.

Based on the estimated value of the position, the traveling time, and the traveling speed of the vehicle VE (hereinafter referred to as a branch line vehicle) traveling on the branch line R2 and the estimated value of the position, the traveling time, and the traveling speed of the vehicle VE (hereinafter referred to as a vehicle to be merged) traveling on the lane of the main line R1 on the side of the branch line R2, the merging prediction apparatus 5 predicts a relative position between the branch line vehicle and the vehicle to be merged at the merging point P, and determines whether the branch line vehicle can merge with the main line R1 based on the predicted relative position. The merging prediction apparatus 5 determines that merging is possible when there is a room (L) where the branch line vehicle can enter between the preceding vehicle to be merged and the following vehicle to be merged in the prediction result of the relative position, and determines that merging is impossible when there is no room (L). The room L may be set in common to all vehicle types or may be set according to the vehicle type of the branch line vehicle to be determined. For example, the merging prediction apparatus 5 may previously hold a room table for storing the room L of each vehicle type, and acquire, from the room table, the room L corresponding to the vehicle type of the vehicle determination information of the branch line traveling information of the branch line vehicle.

As a result of the determination as to whether or not the merging is possible, if the merging is possible with the current traveling speed of the branch line vehicle, the merging prediction apparatus 5 determines the current traveling speed of the branch line vehicle as the recommended merging speed of the branch line vehicle. On the other hand, if the merging is impossible with the current traveling speed of the branch line vehicle, the merging prediction apparatus 5 calculates a traveling speed at which the branch line vehicle can merge based on the estimated value of the position, the traveling time, and the traveling speed of the branch line vehicle, and the estimated value of the position, the traveling time, and the traveling speed of the vehicle to be merged, and determines the calculated traveling speed as the recommended merging speed of the branch line vehicle.

The merging prediction apparatus 5 generates the merging support information including the recommended merging speed for each branch line vehicle (vehicle ID). The merging support information includes the vehicle ID of the branch line vehicle and the recommended merging speed. The merging prediction apparatus 5 transmits the merging support information and the merging traveling information for the branch line vehicle to the merging support information distribution apparatus 6. The merging traveling information includes the vehicle ID, the estimated value (latitude and longitude) of the position of the branch line traveling information, the traveling time, and the traveling azimuth angle of the branch line vehicle. The communication between the merging prediction apparatus 5 and the merging support information distribution apparatus 6 is performed using the existing communication network.

Figure 3:
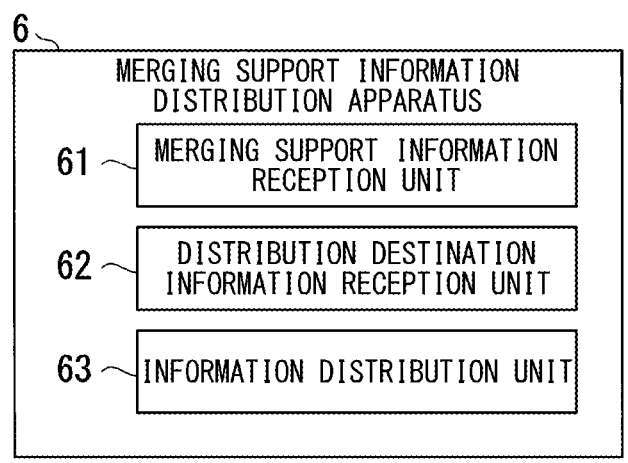
FIG. 3 is a block diagram showing a configuration example of a merging support information distribution apparatus according to the embodiment.

FIG. 3 is a block diagram showing a configuration example of the merging support information distribution apparatus according to this embodiment. In FIG. 3, the merging support information distribution apparatus 6 includes a merging support information reception unit 61, a distribution destination information reception unit 62, and an information distribution unit 63.

The merging support information reception unit 61 receives the merging support information and the merging traveling information from the merging prediction apparatus 5.

The distribution destination information reception unit 62 receives distribution destination registration information from the mobile terminal UE via a mobile communication network NW. The distribution destination registration information includes terminal movement information indicating a movement state of a mobile terminal UE mounted on the vehicle VE (branch line vehicle) traveling on the branch line R2 and terminal identification information (terminal ID) for identifying the mobile terminal UE. The distribution destination information reception unit 62 stores the distribution destination registration information received from the mobile terminal UE in the distribution destination information database 7. The terminal movement information of the mobile terminal UE includes the position (latitude and longitude) of the mobile terminal UE and the moving time (time at which the mobile terminal UE has moved from the position of the mobile terminal UE (latitude and longitude)) of the mobile terminal UE. The position of the mobile terminal UE is obtained using, for example, a GPS (Global Positioning System).

The information distribution unit 63 specifies the mobile terminal UE as a distribution destination, to which the merging support information is to be distributed, having the same vehicle ID as that of the merging traveling information, based on the merging traveling information received from the merging prediction apparatus 5 and the terminal movement information of the distribution destination registration information stored in the distribution destination information database 7. The merging traveling information is based on the branch line traveling information of the branch line vehicle. The information distribution unit 63 distributes the merging support information to the specified mobile terminal UE via the mobile communication network NW based on the terminal ID of the mobile terminal UE specified as the distribution destination to which the merging support information is to be distributed.

The mobile communication network NW is, for example, a mobile phone network such as LTE. The mobile terminal UE is a subscriber terminal of the mobile communication network NW and is, for example, a mobile communication terminal apparatus such as a smartphone or a tablet-type computer (tablet PC). The mobile terminal UE may be provided in the vehicle VE or may be carried by a person riding the vehicle VE, such as a smartphone. The terminal ID of the mobile terminal UE is associated with a communication address of the mobile terminal UE, and is, for example, a mobile phone number.

As an example of this embodiment, the merging support information may be distributed from the merging support information distribution apparatus 6 to the mobile terminal UE using an IP (Internet Protocol) touch-tone line. In this case, the mobile terminal UE always establishes a TCP (Transmission Control Protocol) tunnel with a touch-tone server providing the IP touch-tone line via the mobile communication network NW. The IP touch-tone line of the mobile terminal UE is associated with the terminal ID of the mobile terminal UE. The information distribution unit 63 distributes the merging support information to the specified mobile terminal UE using an IP touch-tone line associated with the terminal ID of the mobile terminal UE specified as the distribution destination to which the merging support information is to be distributed.

Here, a method of determining the distribution destination of the merging support information according to this embodiment will be described.

The information distribution unit 63 checks the branch line vehicle against the mobile terminal UE based on the merging traveling information of the same vehicle ID as that of the merging support information to be distributed and the terminal movement information. Specifically, the information distribution unit 63 calculates, for each mobile terminal UE, a moving azimuth angle indicating a moving direction of the mobile terminal UE based on the positions of the plurality of pieces of terminal movement information at different moving times. Next, the information distribution unit 63 extracts a mobile terminal UE in which the position of the terminal movement information is within a radius N meters (N m) centered on the estimated value of the position of the merging traveling information at the same moving time as the traveling time of the merging traveling information. The radius N m can be freely set. The radius N m is preferably tuned according to the merging point P.

Next, the information distribution unit 63 compares the moving azimuth angle of each of the extracted mobile terminals UE with the traveling azimuth angle of the merging traveling information. As a result of this comparison, the mobile terminal UE in which the difference between the moving azimuth angle of the mobile terminal UE and the traveling azimuth angle of the merging traveling information is within a predetermined threshold is determined to be the distribution destination of the merging support information. At this time, when there are a plurality of mobile terminals UE to become distribution destinations, the distribution of the merging support information is stopped.

The information distribution unit 63 may use the vehicle determination information to determine the mobile terminal UE to be the distribution destination of the merging support information. The vehicle determination information includes information about the vehicle type, exterior color, and license plate. When the vehicle determination information is used, the vehicle determination information of the branch line vehicle acquired by the image recognition apparatus 3 is supplied to the merging support information distribution apparatus 6 together with the merging support information and the merging traveling information through the merging prediction apparatus 5. The vehicle determination information of the vehicle VE on which the mobile terminal UE is mounted, which is the vehicle determination information input to the mobile terminal UE by the user of the mobile terminal UE, is supplied from the mobile terminal UE to the merging support information distribution apparatus 6 via the mobile communication network NW. The information distribution unit 63 checks the vehicle determination information of the branch line vehicle against the vehicle determination information of the vehicle VE on which the mobile terminal UE is mounted, and determines the mobile terminal UE to be the distribution destination of the merging support information based on the result of the checking. For example, when a plurality of mobile terminals UE are determined to be the distribution destinations as a result of the comparison between the moving azimuth angle and the traveling azimuth angle, the mobile terminals UE determined to be the distribution destinations of the merging support information are further narrowed down to determine the final distribution destination of the merging support information using the vehicle determination information. As a result, when the mobile terminals UE determined to be the distribution destination are narrowed down to one mobile terminal UE, this mobile terminal UE is determined to be the final distribution destination of the merging support information. On the other hand, when the distribution destination cannot be narrowed down to one mobile terminal UE even when the vehicle determination information is used, and thus a plurality of mobile terminals UE remain, the distribution of the merging support information is stopped.

Figure 4:
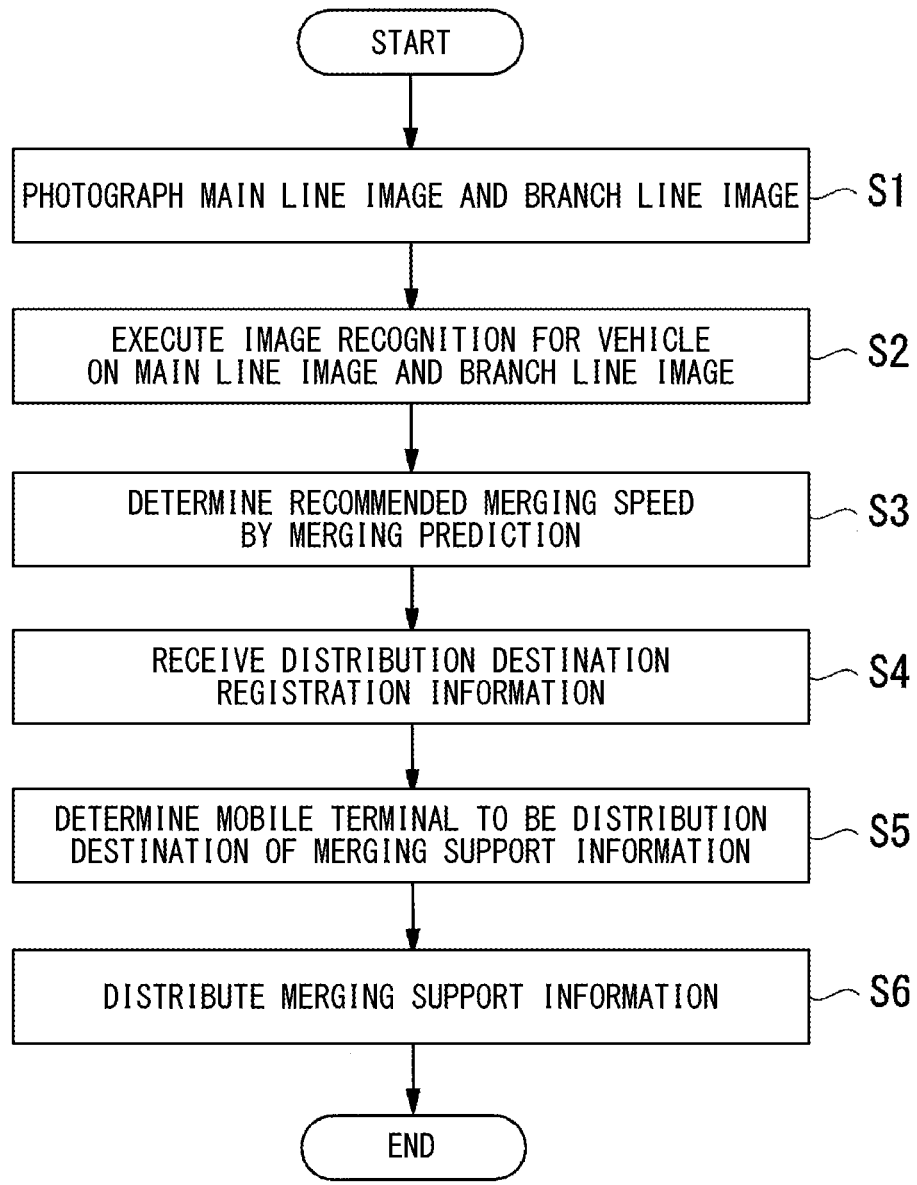
FIG. 4 is a flowchart showing an example of a procedure of the merging support information distribution method according to the embodiment.

Next, a merging support information distribution method according to this embodiment will be described with reference to FIG. 4. FIG. 4 is a flowchart showing an example of the procedure of the merging support information distribution method according to this embodiment.

(Step S1) The main line image pickup apparatus 2-1 photographs the vehicle VE on the main line R1. The branch line image pickup apparatus 2-2 photographs the vehicle VE on the branch line R2 merging with the main line R1.

(Step S2) The image recognition apparatus 3 executes the image recognition processing for recognizing a vehicle on the main image picked up by the main line image pickup apparatus 2-1 to thereby acquire the main line traveling information indicating the traveling state of the vehicle VE traveling on the main line R1. The image recognition apparatus 3 executes the image recognition processing for recognizing a vehicle on the branch line image picked up by the branch line image pickup apparatus 2-2 to thereby acquire the branch line traveling information indicating the traveling state of the vehicle VE (branch line vehicle) traveling on the branch line R2.

(Step S3) The merging prediction apparatus 5 predicts the relative position between the branch line vehicle and the vehicle to be merged (vehicle VE traveling on the lane of the main line R1 on the side of the branch line R2) at the merging point P based on the main line traveling information and the branch line traveling information, and determines whether the branch line vehicle can merge with the main line R1 based on the predicted relative position. The merging prediction apparatus 5 determines the recommended merging speed of the branch line vehicle according to the result of the determination of whether the merging is possible.

(Step S4) The merging support information distribution apparatus 6 receives, from the mobile terminal UE via the mobile communication network NW, the distribution destination registration information including the terminal movement information indicating the movement state of the mobile terminal UE mounted on the branch line vehicle and the terminal ID for identifying the mobile terminal UE.

(Step S5) The merging support information distribution apparatus 6 specifies the mobile terminal UE as a distribution destination, to which the merging support information is to be distributed, having the same vehicle ID as that of the merging traveling information, based on the merging traveling information that is based on the branch line traveling information of the branch line vehicle and the terminal movement information of the distribution destination registration information. The merging support information distribution apparatus 6 distributes the merging support information to the specified mobile terminal UE via the mobile communication network NW based on the terminal ID of the mobile terminal UE specified as the distribution destination to which the merging support information is to be distributed.

According to this embodiment, the mobile terminal UE mounted on the branch line vehicle can be used as a distribution destination of the merging support information, which is to be distributed to the branch line vehicle. Thus, the merging support information can be distributed using the existing mobile communication network NW, thereby contributing to an easy implementation of the merging support system.

Note that the functions of the above-described respective apparatuses are implemented by each apparatus including a CPU (Central Processing Unit) and computer hardware such as a memory, and the CPU executing computer programs stored in the memory. Each apparatus may be configured using a general-purpose computer apparatus or may be configured as a dedicated hardware apparatus. For example, each apparatus may be configured using a server computer connected to a communication network such as the Internet. For example, the vehicle traveling information database 4, the merging prediction apparatus 5, the merging support information distribution apparatus 6, and the distribution destination information database 7 may be implemented by MEC (Multi-access Edge Computing) or cloud computing. According to the MEC, since the service can be provided to a user terminal (mobile terminal UE) at a place closer to the user terminal in the mobile communication network NW, it is possible to contribute to the quick distribution of the merging support information.

Further, the amount of data of the photographed images to be transmitted to and from the image pickup apparatus 2 is large in the image recognition apparatus 3, and the image recognition apparatus 3 may be installed in a communication environment where a sufficient communication capacity between the image pickup apparatus 2 and the image recognition apparatus 3 can be ensured.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

Further, the above-mentioned computer program for implementing the functions of the respective apparatuses may be recorded on a computer-readable recording medium, and the program recorded on the recording medium may be read and executed by a computer system. Here, the term "computer system" may include hardware such as an OS and peripheral devices.

The term "computer-readable recording medium" refers to writable non-volatile memories such as flexible disks, magneto-optical disks, ROMs, and flash memories, portable media such as DVDs (Digital Versatile Disc), and storage devices such as hard disks built into computer systems.

Further, the term "computer-readable recording medium" includes those holding a program for a certain period of time such as a volatile memory (e.g., DRAM (Dynamic Random Access Memory) in the computer system serving as a server or a client when the program is transmitted via a network such as the Internet or a communication line such as a telephone line.

The above program may be transmitted from the computer system storing the program in a storage apparatus or the like to another computer system via a transmission medium or by a transmission wave in the transmission medium. Here, the term "transmission medium" for transmitting the program indicates a medium having a function of transmitting information, for example, a network (communication network) such as the Internet or a communication line (communication line) such as a telephone line.

Further, the above program may be one for implementing a part of the functions described above. The above program may also be a so-called differential file (differential program), which can implement the above-described function by combining it with a program already recorded in the computer system.

What is claimed is:

1. A merging support information distribution apparatus comprising:
   a merging support information reception unit configured to receive merging support information from a merging prediction apparatus, the merging support information being based on main line traveling information indicating a traveling state of a vehicle traveling on a main line and branch line traveling information indicating a traveling state of a vehicle traveling on a branch line and merging with the main line, and the merging support information including a speed recommended for the vehicle traveling on the branch line to merge with the main line;
   a distribution destination information reception unit configured to receive distribution destination registration information including terminal movement information and terminal identification information from a mobile terminal via a mobile communication network, the terminal movement information indicating a movement state of the mobile terminal mounted on the vehicle traveling on the branch line, and the terminal identification information identifying the mobile terminal; and
   an information distribution unit configured to specify the mobile terminal to be a distribution destination to which the merging support information is distributed based on the branch line traveling information and the terminal movement information, and distribute the merging support information to the specified mobile terminal via the mobile communication network based on the terminal identification information of the specified mobile terminal.

2. A merging support system comprising:
   the merging support information distribution apparatus according to claim 1;
   a main line image pickup apparatus configured to photograph a vehicle on a main line;
   a branch line image pickup apparatus configured to photograph a vehicle on a branch line merging with the main line;
   an image recognition apparatus configured to acquire main line traveling information based on a main line image picked up by the main line image pickup apparatus, and acquire branch line traveling information based on a branch line image picked up by the branch line image pickup apparatus, the main line traveling information indicating a traveling state of the vehicle traveling on the main line, and the branch line traveling information indicating a traveling state of the vehicle traveling on the branch line; and
   a merging prediction apparatus configured to generate merging support information including a speed recommended for the vehicle traveling on the branch line to merge with the main line based on the main line traveling information and the branch line traveling information.

3. A merging support information distribution method comprising:
- receiving, by a merging support information distribution apparatus, merging support information from a merging prediction apparatus, the merging support information being based on main line traveling information indicating a traveling state of a vehicle traveling on a main line and branch line traveling information indicating a traveling state of a vehicle traveling on a branch line and merging with the main line, and the merging support information including a speed recommended for the vehicle traveling on the branch line to merge with the main line;
- receiving, by the merging support information distribution apparatus, distribution destination registration information including terminal movement information and terminal identification information from a mobile terminal via a mobile communication network, the terminal movement information indicating a movement state of the mobile terminal mounted on the vehicle traveling on the branch line, and the terminal identification information identifying the mobile terminal; and
- specifying, by the merging support information distribution apparatus, the mobile terminal to be a distribution destination to which the merging support information is distributed based on the branch line traveling information and the terminal movement information, and distribute the merging support information to the specified mobile terminal via the mobile communication network based on the terminal identification information of the specified mobile terminal.

4. A non-transitory computer readable medium storing a computer program for causing a computer to execute:
- receiving merging support information from a merging prediction apparatus, the merging support information being based on main line traveling information indicating a traveling state of a vehicle traveling on a main line and branch line traveling information indicating a traveling state of a vehicle traveling on a branch line and merging with the main line, and the merging support information including a speed recommended for the vehicle traveling on the branch line to merge with the main line;
- receiving distribution destination registration information including terminal movement information and terminal identification information from a mobile terminal via a mobile communication network, the terminal movement information indicating a movement state of the mobile terminal mounted on the vehicle traveling on the branch line, and the terminal identification information identifying the mobile terminal; and
- specifying the mobile terminal to be a distribution destination to which the merging support information is distributed based on the branch line traveling information and the terminal movement information, and distribute the merging support information to the specified mobile terminal via the mobile communication network based on the terminal identification information of the specified mobile terminal.

\* \* \* \* \*